United States Patent [19]

Streuli et al.

[11] 4,293,410

[45] Oct. 6, 1981

[54] MAGNETIC FILTER

[75] Inventors: Hans Streuli, Baar; Joseph Rüedi, Zurich, both of Switzerland

[73] Assignee: Hans Streuli AG, Baar, Switzerland

[21] Appl. No.: 75,031

[22] Filed: Sep. 13, 1979

[30] Foreign Application Priority Data

Sep. 21, 1978 [CH] Switzerland .......................... 9892/78

[51] Int. Cl.³ .............................................. B01D 35/06

[52] U.S. Cl. .................................... 210/107; 210/222; 209/219; 209/232

[58] Field of Search ................. 210/222, 223, 97, 107; 209/228, 229, 217, 223 A, 219, 232; 162/317, 321

[56] References Cited

U.S. PATENT DOCUMENTS

| | | | |
|---|---|---|---|
| 2,564,515 | 8/1951 | Vojel | 209/223 A |
| 2,607,478 | 8/1952 | Newton | 209/223 A |
| 2,736,432 | 2/1956 | Gardes | 210/222 |
| 2,934,140 | 4/1960 | Gadwillie | 162/321 |
| 3,321,360 | 5/1967 | Halt | 162/321 |
| 3,522,883 | 8/1970 | Stechman | 210/222 |
| 3,837,216 | 9/1974 | Shinohara | 210/86 |
| 4,122,005 | 10/1978 | Forssberg et al. | 210/222 |

FOREIGN PATENT DOCUMENTS

| | | | |
|---|---|---|---|
| 459107 | 7/1968 | Switzerland | 210/222 |

*Primary Examiner*—Theodore A. Granger

*Attorney, Agent, or Firm*—Cooper, Dunham, Clark, Griffin & Moran

[57] ABSTRACT

The magnetic filter has a magnetic cylinder (2) pivotally mounted in a housing (1) and having an inclined stripper (14). The bottom of the cylinder (2) is surrounded by a casing (5), whereby a flow channel (6) for the medium to be filtered is created between the cylinder (2) and the casing (5). One portion (5*b*) of the casing (5) can be mobile so that the flow-channel profile section can be changed. Decreasing the channel profile section causes an increase in the flow resistance, resulting in a backwash, so that even in cases of small quantities the level and hence the inflow characteristic of the filter is approximately the same as that of the full-load quantity.

1 Claim, 2 Drawing Figures

MAGNETIC FILTER

BACKGROUND AND BRIEF DESCRIPTION OF THE INVENTION

The invention concerns a magnetic filter that consists of a magnetic cylinder with stripper, pivot-mounted in a casing, sheathed in a casing at the bottom, whereby a flow channel for the medium to be filtered is formed between the cylinder and the casing.

The magnetic filter serves to remove magnetically conductive and non-conductive bits of dirt from coolants and lubricants so that they can be re-used. The degree of cleanliness of coolants and lubricants is a decisive factor in manufacturing precision and surface finish of processed machine parts. Improving the quality of the magnetic filter leads to an increase in the service life of tools, parts, and coolants and lubricants.

Automatic magnetic filters have long been known in modern technology, e.g., from U.S. Pat. No. 2,736,432 and from Swiss Pat. No. 459.107. The automatic devices most commonly in use are equipped with a long magnetic cylinder that consists of several magnetic fields. The magnetic cylinder, which is operated by a motor with reducing gear is housed in a casing which surrounds the cylinder from below. The medium to be purified is usually fed above the axle over the flow passage, which travels in the axial direction of the magnetic body, by the tractive power of the magnetic cylinder. The outlet on the opposite side is arranged in the same way, but is normally somewhat deeper, to guarantee a good flow. The magnetically attracted impurities contained in the fluid to be filtered collect on the magnetic cylinder in the form of beardlike clusters, with larger pieces of debris being attracted faster than small ones. The magnetic flux decreases as the distance between the magnets and the individual pieces increases. The smallest pieces that flow into the channel in the medium to be purified from the outside, that is, from the cylinder surface that is most distant, for the most part do not have sufficient time during the flow to reach the magnetic surfaces of the cylinder.

If in such a filter the rate or quantity of flow is reduced, the level at entry into the flow channel drops, the magnetic cylinder area acted upon becomes smaller, and the filter capacity thereby also becomes smaller. In the case of still smaller quantities, the medium to be purified washes over the inlet edge, thereby creating turbulences in the flow channel and thereby reducing still further the efficiency of the magentic filter.

The purpose of the invention is, on the one hand, to improve the efficiency of the magnetic filter, and on the other hand to maintain the flow conditions of the medium to be purified at their best, even in cases of reduced rate of flow.

According to the invention, this task is solved by making the profile section of the flow channel variable. Advantageously, at least a portion of the casing is mobile. However, provision can also be made for a slider that extends adjustably into the flow channel.

The medium to be purified is thus guided in the direction of the magnets after the first phase of stabilization and filtering out of the largest particles, on the one hand, and on the other hand, the magnetic flux during the approach of the particle to the magnet is strengthened. Decreasing the profile section of the channel produces an increase in the flow resistance, resulting in a backwash, so that even in cases of small quantities the level and hence the inflow characteristic of the filter approximately correspond to those of the full load quantity.

In a preferred form of embodiment, the magnetic filter has a control device which switches the driving motor of the magnetic cylinder on and off, depending on the fluid level.

Control of the rotation of the magnetic cylinder by means of a float is well known from Swiss Patent No. 459.107. However, a mobile control of this type is not sufficiently reliable, and it has too broad a control range to guarantee a continuous high efficiency rate.

These disadvantages are eliminated by the abovementioned advantageous embodiment with an electrical control. Filter efficiency can best be automatically adapted to operating conditions and the physical qualities of the lubricants and coolants in conjunction with the variable profile section of the flow.

BRIEF DESCRIPTION OF THE DRAWINGS

The following examples of embodiment of the invention are explained in greater detail by means of the illustrations.

They show.

DETAILED DESCRIPTION

Figure 1:
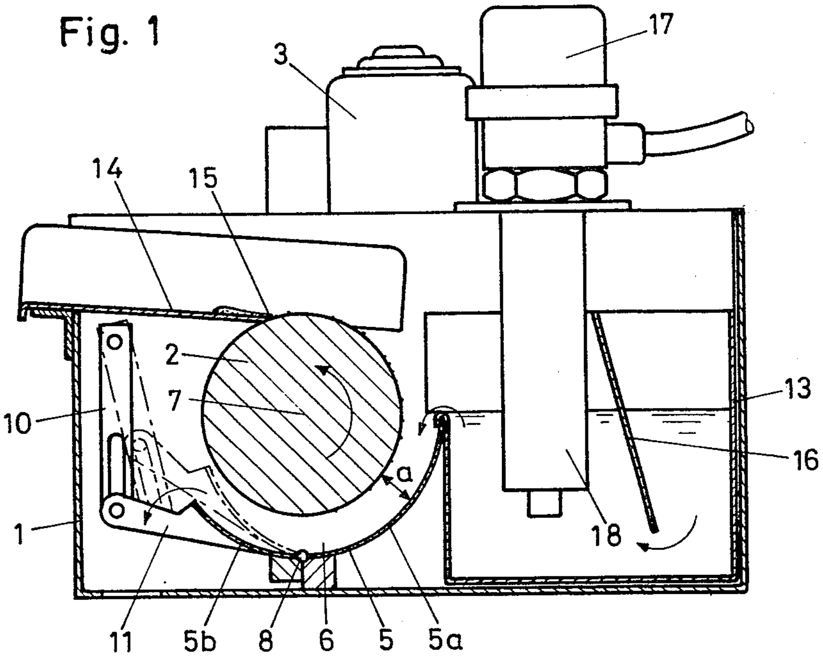
FIG. 1 is a longitudinal view through a magnetic filter.
Figure 2:
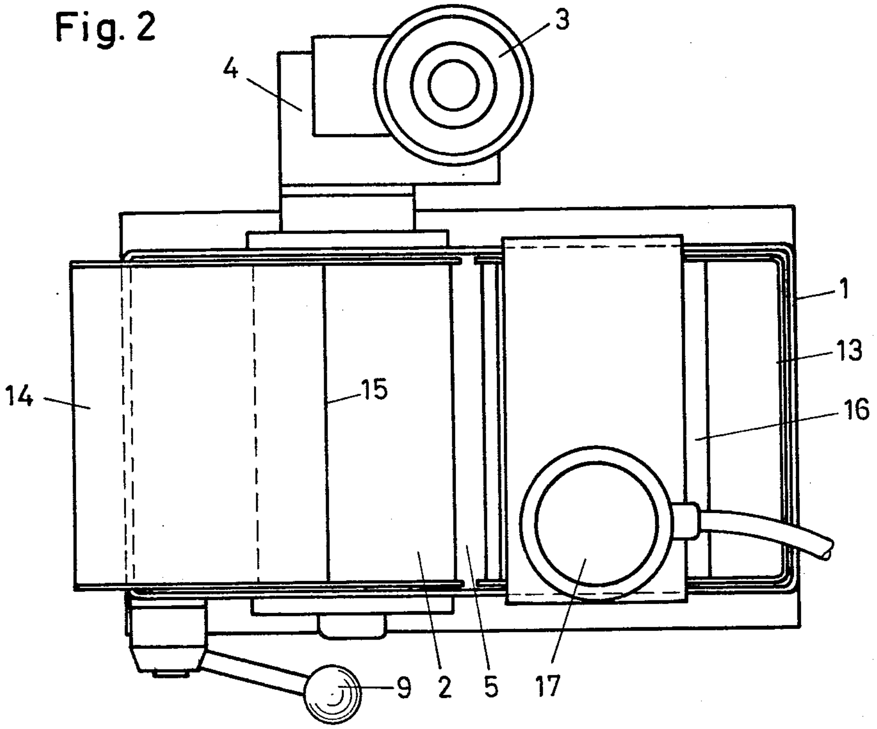
FIG. 2 is a plan view of the magnetic filter according to FIG. 1.

The magnetic filter has a stable aluminum housing 1, in which a horizontal magnetic cylinder 2 is pivot-mounted. The cylinder 2 is made of finely polar, highly efficient permanent magnets that are positioned at narrow intervals and create a strong magnetic field over the entire area of the cylinder. The cylinder is driven by an electric motor 3 through a double worm-gear 4.

A convex sheet-metal casing 5 positioned underneath the magnetic cylinder 2, at a distance a from the surface of the said cylinder, surrounds the lower portion of the cylinder 2. A flow channel 6 for the fluid to be filtered is thereby formed between the surface of the cylinder and the sheet-metal casing 5. The sheet-metal casing 5 consists of a stationary portion 5*a* and a swivel portion 5*b*, the latter being attached to the stationary portion 5*a* by means of a joint 8 parallel to the cylinder axis 7. The casing may also be made of two castings instead of sheet-metal.

A handle 9 positioned outside the housing 1 serves to adjust the casing swivel portion 5*b*, which said handle 9 is connected to the swivel portion 5*b* by means of two toggle joints 10, 11. When the flow cross-section is constant throughout its length, that is, in the case of a constant slit height a, both casing portions 5*a* and 5*b* are positioned coaxially to the magnetic cylinder 2.

The mobile casing portion 5*b* can be adjusted, by means of the handle 9, in such manner that the slit continuously narrows down in the direction of the flow, a wedge-shaped, tapering flow profile section thereby being created in the area of the mobile casing portion 5*b*. This adjustment of the mobile casing portion is shown in the figures by the dotted lines, it being possible to position the handle 9 alternatively on one or the other side of the housing.

In place of manual adjustment, it would also be possible automatically to adjust the flow profile section, e.g., in a manner not described in greater detail, by motor drive depending on the flow quantity measured.

A known, inclined stripper sheet 14 is attached adjacent its upper end to the housing 1, and its front edge 15 rests on the cylinder surface.

An aluminum prefilter chamber 13 is positioned in advance of the magnetic cylinder, in which said chamber a dirt discharge cage can be installed. The inclined baffle plate 16 in the prefilter chamber 13 serves to stabilize the fluid flowing in.

The medium to be filtered must flow into the flow channel 6 in an even and laminar distribution over the entire surface, since turbulence influence the filter efficiency. A certain sedimentation occurs during the stabilization of the prefilter chamber 13; in particular, specifically heavy particles, such as grinding-wheel dust, borings, etc., are deposited. The dirt discharge cage provides major assistance in purification, since the sedimentation can easily and quickly be removed by this cage; an expensive cleaning is unnecessary.

From the pre-chamber 13, the medium flows by the baffle plate 16 and then smoothly under the magnetic cylinder 2. The flow slit can be made wider or narrower in the shape of a wedge, as necessary, in the direction of the flow. The larger metal particles are thereby first separated out, and the effectiveness of the filtration in the micron range is considerably increased in the narrowed areas. To achieve increased purification, the discharge can be backed up at the inflow level by means of a feedpipe or by raising the adjustable baffle plate.

The adjustable stripper sheet 14 is tilted upwardly slightly so that the fluid remaining in the filtered material can flow back into the container. The debris is continually pushed along the stripper sheet and then, thoroughly dry, falls into a refuse container provided for that purpose.

An optimum position as regards the desired filtration and flow quantity can be found for every need by continuously varying the flow wedge. A filter installation can immediately be adapted to altered operating conditions or application. In this way metal particles are almost always completely removed, and thanks to the wetting effect most of the non-metallic substances are removed, continuously from the coolant and the lubricant (oil, water, emulsions).

Instead of causing the magnetic cylinder 2 continuously to rotate, the magnetic filter can be equipped with an electronic drive control. This permits the equipment to be operated as an alluvial filter, that is, a filter of non-magnetizable material, in addition to working as a pure magnetic filter. In conjunction with the adjustment equipment, that is, by changing the flow wedge, almost any desired degree of filtration can be achieved with the cylinder control. A capacitative liquid level responsive switch 17 has its level-sensing parts 18 projecting into the fluid in the prefilter chamber 13. It is designed for fine-tuning, and responds to the slightest changes in the flow resistance or in the fluid level, and it automatically switches the drive motor 3 on and off within a narrow adjustment band. Any necessity for manual re-adjustment in the event of a change in the degree of impurity in the fluid to be filtered is thereby eliminated.

The basic method of operation corresponds to that of the magnetic filter without electric control, only the magnetic cylinder does not revolve when it is put into operation. The magnetizable particles immediately form a beard-shaped screen in the flow wedge, which leads directly to the depositing of non-magnetizable particles and thereby forms a thick filtering layer.

The degree of filtration is continually adjusted in the level responsive switch. If the flow resistance in the filter exceeds a predetermined value, the level rises and the switch initiates a forward revolution of the magnetic cylinder. If a small portion of the filter layer is discharged, the flow resistance or the level is reduced, the motor is switched off, and the magnetic cylinder again remains stationary. This modern type of electronic capacitative control can work in a narrow control range with short pulse intervals, so as to maintain the degree of filtration constantly within narrow limits. In addition, the range can be moved up or down at will. The measuring point can be inside or outside the filter housing, depending on the medium.

In other embodiments, an electrically magnetizable cylinder can be provided instead of the magnetic cylinder. To change the flow channel cross-section, it would also be possible to have a slider project adjustably into the channel in the case of a stationary casing. Instead of the electrical controller, a diaphragm switch or a proximity switch, which control the electric motor independent of the fluid level, can also be used. Depending on the type of medium, a photocell control would also be conceivable.

We claim:

1. Apparatus for filtering both magnetic and non-magnetic particles from a liquid medium comprising:

a. a chamber for receiving the liquid medium, said chamber having one wall defining a horizontal weir over which the liquid medium flows;

b. means defining a conduit for the medium passing over the weir, including:

1. a magnetic cylinder rotatable about a horizontal axis and having a surface spaced from the weir;
2. a first conduit wall section spaced from and concentric with the surface of the cylinder, said first wall section being fixed in position and having its upper end connected to the weir, so that all the liquid medium flowing over the weir passes between the wall section and the cylinder;
3. a second conduit wall section pivotally connected to the downstream end of the first conduit wall section, said first and second sections having the same radius of curvature; and
4. means for adjusting the position of said second wall section on its pivotal connection;
5. the magnetic particles in said medium being attracted by the magnetic cylinder as they pass through the conduit and forming a beard-shaped screen effective to trap non-magnetic particles, said screen and the trapped particles cooperating to impede the flow of the medium and thereby to raise the level of the medium in the chamber; and c. rotation control means for initiating rotation of the magnetic cylinder in a direction opposite to the direction of flow when the medium in said conduit exceeds a predetermined level, and for stopping said rotation when the medium falls below said level, said rotation control means comprising:

1. means for driving the cylinder in a direction opposite to the direction of flow of the medium; and
2. capacitive means responsive to the level of the liquid medium in the chamber and controlling the driving means to initiate rotation of the cylinder when the medium exceeds said predetermined level and to stop the rotation of said cylinder when the medium falls below said predetermined level; and d. a stripper sheet having one end engaging the upper surface of the cylinder and slanting upwardly from said one end, for removing accumulated magnetic and non-magnetic particles from the cylinder, the upward slant of the stripper sheet being effective to allow liquid remaining in the accumulated particles to drain back into the conduit.

* * * * *